US012607470B2

(12) United States Patent

Imai et al.

(10) Patent No.: US 12,607,470 B2
(45) Date of Patent: Apr. 21, 2026

(54) NAVIGATION SYSTEM, NAVIGATION METHOD, AND STORAGE MEDIUM STORING NAVIGATION PROGRAM

(71) Applicant: HONDA MOTOR CO., LTD., Tokyo (JP)

(72) Inventors: Tomohiro Imai, Wako (JP); Shigenobu Mitsuzawa, Wako (JP); Keisuke Nakamura, Wako (JP); Satoru Shinkawa, Wako (JP); Hideki Sakai, Wako (JP); Hiroshi Ono, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 212 days.

(21) Appl. No.: 18/458,635

(22) Filed: Aug. 30, 2023

(65) Prior Publication Data

US 2024/0085198 A1 Mar. 14, 2024

(30) Foreign Application Priority Data

Sep. 14, 2022 (JP) ................................. 2022-146523

(51) Int. Cl.
*G01C 21/34* (2006.01)

(52) U.S. Cl.
CPC ................................. *G01C 21/3453* (2013.01)

(58) Field of Classification Search
None
See application file for complete search history.

(56) References Cited

U.S. PATENT DOCUMENTS

| | | | | |
|---|---|---|---|---|
| 11,545,262 B2 * | 1/2023 | Yasui | ...................... | B60R 16/02 |
| 11,922,787 B1 * | 3/2024 | Barcia | ................. | G08B 21/043 |
| 2004/0204837 A1 * | 10/2004 | Singleton | ............. | G09B 29/007 701/410 |
| 2009/0198733 A1 * | 8/2009 | Gounares | ............... | G16H 15/00 |
| 2014/0200800 A1 | 7/2014 | Vogel | | |
| 2018/0266834 A1 * | 9/2018 | Cronin | ............... | B60W 50/082 |
| 2021/0039652 A1 * | 2/2021 | Ito | ......................... | B60W 40/08 |
| 2021/0381844 A1 * | 12/2021 | Baig | ................. | G01C 21/3644 |
| 2022/0187085 A1 * | 6/2022 | Luciani | ............. | G01C 21/3484 |
| 2025/0035456 A1 * | 1/2025 | Isobe | ....................... | A61B 5/18 |

FOREIGN PATENT DOCUMENTS

| | | |
|---|---|---|
| JP | 2005-4503 A | 1/2005 |
| JP | 2008-032558 A | 2/2008 |
| JP | 2010-197071 A | 9/2010 |
| JP | 2018-60336 A | 4/2018 |

OTHER PUBLICATIONS

Japanese Office Action dated Jul. 15, 2025 issued in corresponding Japanese application No. 2022-146523; English machine translation included (9 pages).

* cited by examiner

*Primary Examiner* — Ryan Rink
(74) *Attorney, Agent, or Firm* — Rankin, Hill & Clark LLP

(57) ABSTRACT
A navigation system includes an evaluation unit for evaluating a degree of a health state quality for a driver of a moving body, and a route guidance unit for searching a route from a current position of the moving body to a destination, and for performing guidance of the searched route, the route guidance unit determines a search condition of a route to the destination based on an evaluation result of a health state of the driver in the evaluation unit.

9 Claims, 7 Drawing Sheets

NAVIGATION SYSTEM, NAVIGATION METHOD, AND STORAGE MEDIUM STORING NAVIGATION PROGRAM

INCORPORATION BY REFERENCE

The present application claims priority under 35 U.S.C. § 119 to Japanese Patent Application No. 2022-146523 filed on Sep. 14, 2022. The content of the application is incorporated herein by reference in its entirety.

BACKGROUND OF THE INVENTION

Field of the Invention

The present invention relates to a navigation system, a navigation method, and a non-transitory computer-readable storage medium storing a navigation program.

Description of the Related Art

Japanese Patent Laid-Open No. 2008-32558 discloses a guiding device for a vehicle, the guiding device predicts a traveling spot of a vehicle after a prescribed time elapses from an operation start of the vehicle, and in the case where a resting area is not provided within a prescribed range from the predicted traveling spot, the guiding device guides a vehicle user to take a rest, each time when approaching a stoppable resting area during a period from a travel start of the vehicle until the prescribed time elapses.

While guidance of a resting area to a driver such as in the above conventional technology is expected to have an effect for the point of realizing early recovery from fatigue, there is room for improvement for the point of consideration related to the possibility of health deterioration of a driver.

The objective of the present invention is to enable route guidance to be performed in a navigation system, the route guidance taking into consideration health deterioration of a driver.

SUMMARY OF THE INVENTION

One aspect of the present invention is a navigation system that includes an evaluation unit for evaluating a degree of a health state quality for a driver of a moving body, and a route guidance unit for searching a route from a current position of the moving body to a destination, and for performing guidance of the searched route, the route guidance unit determines a search condition of a route to the destination based on an evaluation result of a health state of the driver in the evaluation unit.

According to another aspect of the present invention, the navigation system further includes a load estimation unit for evaluating a degree of a driving load estimated for the driver in a case where the driver travels along a route, the search condition includes a first search condition subject to a condition of searching a route where a degree of a driving load estimated for the driver is lower than a prescribed level.

According to another aspect of the present invention, the evaluation unit determines whether a degree of a health state quality for the driver is within a first degree range predetermined as showing a health state worse than a normal health state, or within a second degree range predetermined as showing a health state worse than the first degree range, and when a degree of a health state quality for the driver is within the first degree range, the route guidance unit searches a route to the destination by the first search condition.

According to another aspect of the present invention, the navigation system further includes a region specification unit for specifying a first region on a map in which a distance from an address of a medical related facility is within a range of a predetermined prescribed distance, and for specifying a second region on a map in which an arrival time until arriving at a medical related facility by an applicable arbitrary movement means is within a range of a predetermined prescribed time, the search condition includes a second search condition subject to a condition of searching a route to the destination, the route passing within a range of the first region and/or the route passing within a range of the second region.

According to another aspect of the present invention, the evaluation unit determines whether a degree of a health state quality for the driver is within a first degree range predetermined as showing a health state worse than a normal health state, or within a second degree range predetermined as showing a health state worse than the first degree range, and when a degree of a health state quality for the driver is within the second degree range, the route guidance unit searches a route to the destination by the second search condition.

According to another aspect of the present invention, the navigation system further includes a notification unit for performing a notification to the driver, when a route to the destination searched by using the second search condition includes a route portion passing through a region on a map, the route portion being neither the first region nor the second region, the route guidance unit instructs the notification unit, and the route guidance unit performs a notification of the fact that the searched route includes the route portion.

According to another aspect of the present invention, the region specification unit collects information for a degree of congestion of a medical related facility, and the region specification unit specifies the second region targeting a medical related facility where the degree of congestion is lower than a predetermined level.

According to another aspect of the present invention, the navigation system further includes a notification unit for performing a notification to the driver, the evaluation unit evaluates a degree of a health state quality for a passenger other than the driver, the passenger being on board the moving body, and when a degree of a health state quality for the passenger evaluated by the evaluation unit is within a degree range predetermined as showing a health state worse than a normal health state, the notification unit performs a notification of the fact that the health state of the passenger is bad.

Another aspect of the present invention is a navigation method executed by a computer of a navigation system, the navigation method including an evaluation step for evaluating a degree of a health state quality for a driver of a moving body; and a route guidance step for searching a route from a current position of the moving body to a destination, and the route guidance step for performing guidance of the searched route, in the route guidance step, a search condition of a route to the destination is determined based on an evaluation result of a health state of the driver in the evaluation step.

Another aspect of the present invention is a navigation program for causing a computer of a navigation system to function as an evaluation unit for evaluating a degree of a health state quality for a driver of a moving body, and a route guidance unit for searching a route from a current position of the moving body to a destination, and for performing guidance of the searched route, the route guidance unit determines a search condition of a route to the destination based on an evaluation result of a health state of the driver in the evaluation unit.

According to the present invention, route guidance can be performed in a navigation system, the route guidance taking into consideration health deterioration of a driver.

DETAILED DESCRIPTION OF THE PREFERRED EMBODIMENTS

Hereinafter, an embodiment of the present invention will be described by referring to the figures.

Figure 1:
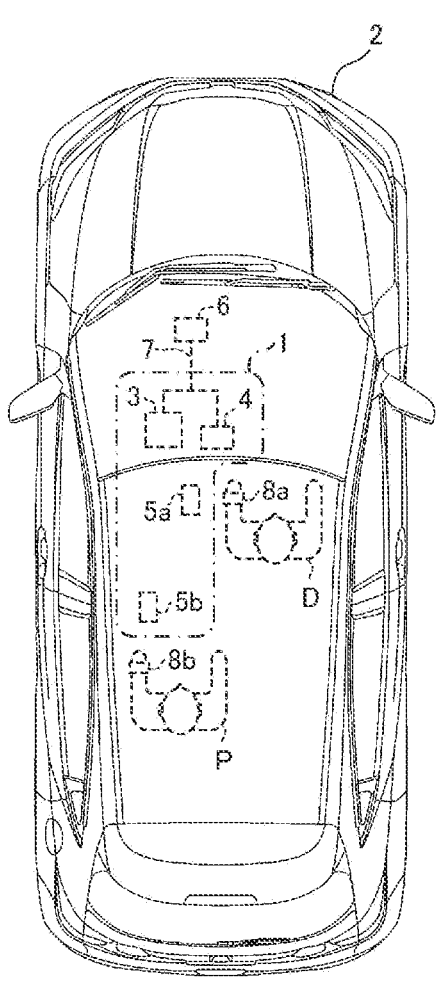
FIG. 1 is a figure showing a configuration of a navigation system according to an embodiment of the present invention.

FIG. 1 is a figure showing a configuration of a navigation system 1 according to an embodiment of the present invention. The navigation system 1 shown by the illustrated dashed-dotted rectangles is mounted in a moving body 2. The moving body 2 is a vehicle, for example, in the present embodiment. However, the moving body 2 is not limited to a vehicle, and the moving body 2 can be an arbitrary moving body, driven by a person, capable of moving in a land region.

The navigation system 1 can include, for example, a navigation device 3 and a Human-Machine Interface (HMI) control device 4, the navigation device 3 and the HMI control device 4 being mounted in the moving body 2, and portable terminals 5a and 5b respectively carried into the moving body 2 by a driver D and a passenger P, the driver D and the passenger P being occupants. Hereinafter, the portable terminals 5a and 5b will also be collectively called a portable terminal 5. The portable terminal 5 is, for example, a smartphone.

The moving body 2 further includes a Telematics Control Unit (TCU) 6. The TCU 6 is a wireless communication device, and the TCU 6 includes a short-range wireless communicator for performing short-range communication such as Bluetooth (Registered Trademark). The TCU 6 may further include a long-range wireless communicator for performing communication via a communication network (not illustrated) such as the Internet.

The navigation device 3, the HMI control device 4, and the TCU 6 are communicatively connected to one another by an in-vehicle network 7. The portable terminal 5 and the TCU 6 are communicatively connected to one another by Bluetooth communication, the Bluetooth communication being the short-range wireless communication. The portable terminal 5 is communicatively connected to the navigation device 3 and the HMI control device 4 via the TCU 6.

In the present embodiment, the portable terminals 5a and 5b each receive biological data of the driver D and the passenger P measured by wearable terminals 8a and 8b, the wearable terminals 8a and 8b being worn by the driver D and the passenger P, and the portable terminals 5a and 5b each evaluate a degree of a health state quality for the driver D and the passenger P. Hereinafter, the wearable terminals 8a and 8b will also be collectively called a wearable terminal 8.

The navigation device 3 acquires a result of the evaluation for a health state of the driver D, from the portable terminal 5a, and the navigation device 3 determines a search condition of a route to a destination designated by the driver D, based on the result of the evaluation. Also, the navigation device 3 determines one route by performing a route search, in accordance with the determined search condition, and the navigation device 3 performs route guidance to the driver D, via the HMI control device 4.

Figure 2:
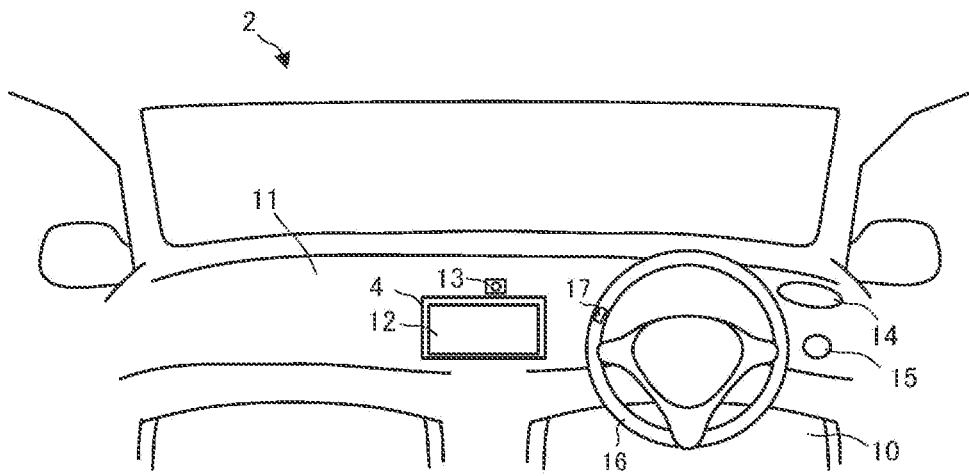
FIG. 2 is a figure showing an example of a configuration of an occupant compartment of a moving body.

FIG. 2 is a figure showing an example of a configuration of an occupant compartment of the moving body 2. The HMI control device 4 and a compartment camera 13 are arranged, almost in the center in a vehicle width direction, on an instrument panel 11 in front of a driver's seat 10. The HMI control device 4 is, for example, a Display Audio, the HMI control device 4 displays images or videos (hereinafter, simply called images) on a first touch panel 12, and the HMI control device 4 acquires information input by a touch operation to the first touch panel 12. Moreover, for example, the HMI control device 4 outputs a voice, and the HMI control device 4 receives a voice input, by a speaker 14 and a microphone 15 provided on a portion of the instrument panel 11 on the driver's seat side. The compartment camera 13 is, for example, a Driver Monitoring Camera (DMC), and the compartment camera 13 images compartment images inside the vehicle compartment, the images including images of the driver. A heart rate sensor 17, which detects a heart rate as biological data of the driver D, may also be included on a steering wheel 16 in front of the driver's seat 10.

Figure 3:
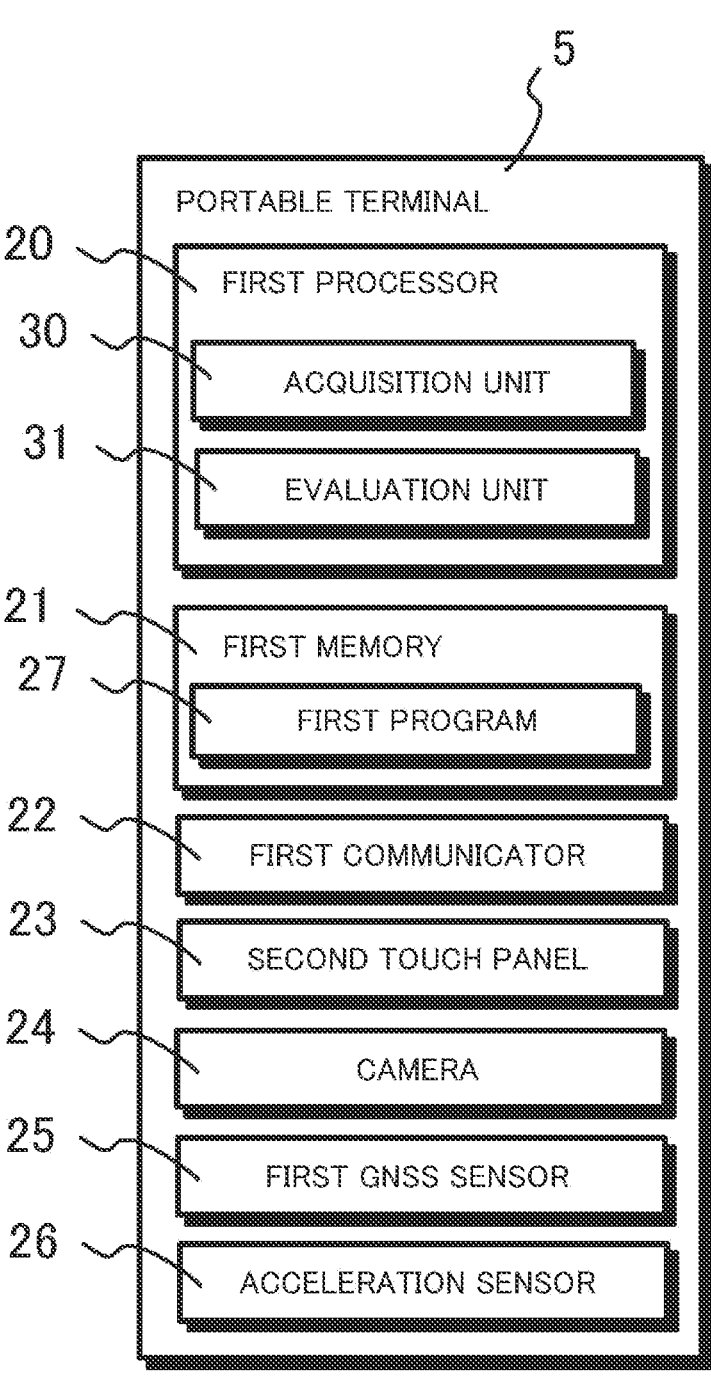
FIG. 3 is a figure showing a configuration of a portable terminal constituting the navigation system.

FIG. 3 is a figure showing a configuration of the portable terminal 5 constituting the navigation system 1.

The portable terminal 5 is, for example, a smartphone. The portable terminal 5 includes a first processor 20, a first memory 21, a first communicator 22, a second touch panel 23, a camera 24, a first Global Navigation Satellite System (GNSS) sensor 25, and an acceleration sensor 26. The acceleration sensor 26 is, for example, a nine-axis acceleration sensor.

The first memory 21 can be constituted of a volatile and/or nonvolatile semiconductor memory. The first communicator 22 includes a transmitter/receiver for the portable terminal 5 to communicate with the wearable terminal 8 and the navigation device 3. For example, the first communicator 22 can include a short-range communicator for performing short-range communication compliant with Bluetooth communication standards or the like between the wearable terminal 8 and the TCU 6. The first communicator 22 can also include a long-range communicator for performing communication via a communication network such as the Internet.

The first processor 20 is, for example, a computer that includes a Central Processing Unit (CPU) and the like. The first processor 20 may be constituted by having a Read Only Memory (ROM) to which programs are written, and a Random Access memory (RAM) for temporary storage of data. Also, the first processor 20 includes an acquisition unit 30 and an evaluation unit 31, as functional elements or functional units.

These functional elements included in the first processor 20 are implemented, for example, by the first processor 20 that is a computer, the first processor 20 executing a first program 27 stored in the first memory 21. The first program 27 can be stored in an arbitrary computer-readable storage medium. Alternatively, the first program 27 may be downloaded from an external server, and then the first program 27 may be stored in the first memory 21. Note that, instead of the above description, all or part of the functional elements included in the first processor 20 may be respectively constituted of hardware including one or more electronic circuit components. Here, the first program 27 constitutes a navigation program in the present disclosure, along with a second program 44 executed by the navigation device 3 and a third program 63 executed by the HMI control device 4.

The acquisition unit 30 acquires biological data of an owner (the driver D or the passenger P; hereinafter, the same) of the portable terminal 5. In the present embodiment, the acquisition unit 30 acquires biological data (pulse wave, heart rate, blood pressure and the like) of the owner, from the wearable terminal 8 worn by the owner on his or her body. However, the wearable terminal 8 is an example, and the acquisition unit 30 can acquire biological data of the owner from various types of devices capable of measuring biological data.

For example, the acquisition unit 30 can acquire a facial image of the owner by a camera 24 included in the portable terminal 5, and the acquisition unit 30 can acquire biological data (for example, blood pressure, pulse wave, heart rate and the like) of the owner, in accordance with conventional technology (for example, refer to Japanese Patent Laid-Open No. 2022-008806), from the facial image. Alternatively, the acquisition unit 30 can acquire biological data of the owner, from a facial image of the owner reflected in a compartment image captured by the compartment camera 13, when the owner himself or herself carries the portable terminal 5, and the owner himself or herself boards the moving body 2. Moreover, in the case where the driver D is the owner, when the driver D grasps the steering wheel 16, the acquisition unit 30 may acquire a heat rate that is biological data of the driver D, by the heart rate sensor 17. The acquisition unit 30 can acquire the facial image captured by the compartment camera 13, or information of a heat rate detected by the heart rate sensor 17, via the HMI control device 4.

Note that identification of a facial image of the owner from an image captured by the camera 24 or the compartment camera 13 can be performed, for example, with a facial image for reference of the owner stored in the first memory 21 beforehand, by a matching process with this facial image for reference, in accordance with conventional technology.

For example, in response to receiving an evaluation information request from the navigation device 3, the evaluation unit 31 performs an evaluation of the health state, and the evaluation unit 31 transmits a result of this evaluation to the navigation device 3.

An evaluation of the health state performed by the evaluation unit 31 can be performed, for example, by calculating an evaluation score (score) showing a health state quality, based on a rating reference for biological data such as blood pressure, heart rate, and pulse wave. The evaluation score can show, for example, a score that increases as the health state improves. Moreover, the rating reference can be determined beforehand.

The evaluation unit 31 determines whether a degree of a health state quality for the driver D is within a first degree range predetermined as showing a health state worse than a normal health state, or the evaluation unit 31 determines whether a degree of a health state quality for the driver D is within a second degree range predetermined as showing a health state worse than the first degree range. For example, when the evaluation score is greater than a first prescribed value, the evaluation unit 31 determines that a health state is good. Moreover, when the evaluation score is less than the first prescribed value and the evaluation score is equal to or greater than a second prescribed value (the second prescribed value set to a value less than the first prescribed value), the evaluation unit 31 determines that a degree of a health state quality is within the first degree range. Moreover, when the evaluation score is less than the second prescribed value, the evaluation unit 31 determines that a degree of a health state quality is within the second degree range.

Next, a configuration of the navigation device 3 included in the moving body 2 will be described.

Figure 4:
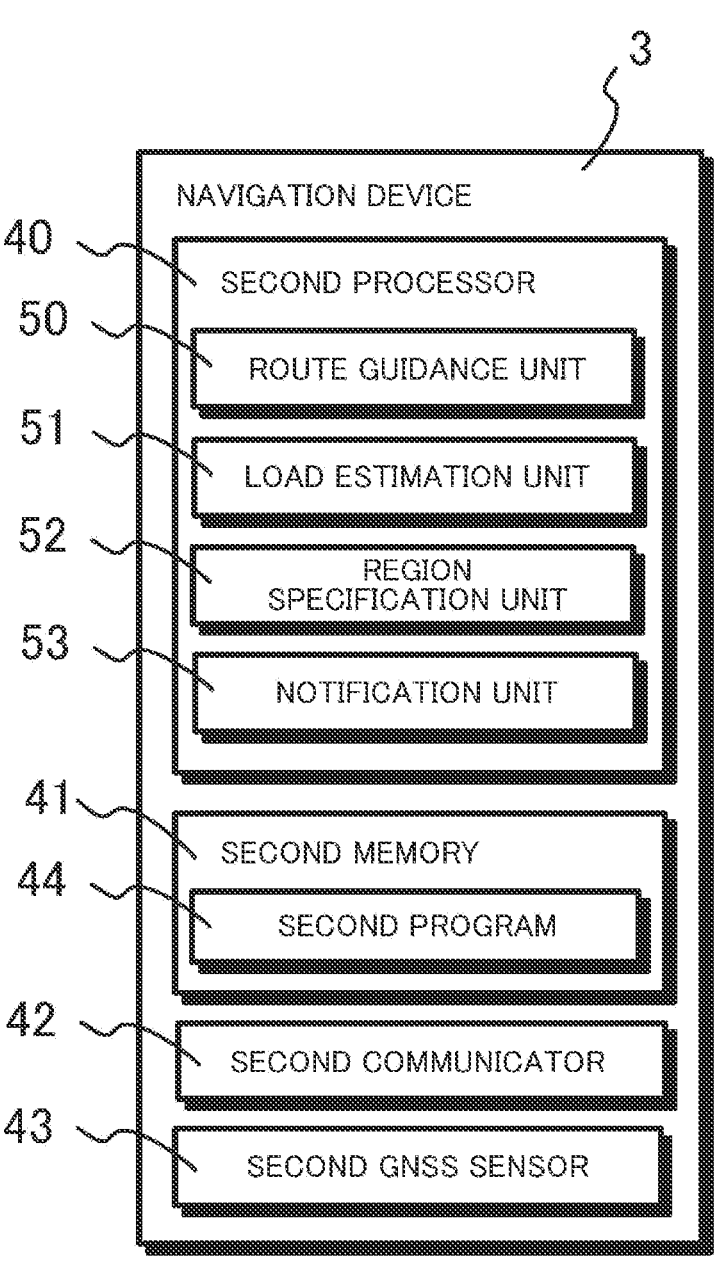
FIG. 4 is a figure showing a configuration of a navigation device constituting the navigation system.

FIG. 4 is a figure showing an example of a configuration of the navigation device 3.

The navigation device 3 includes a second processor 40, a second memory 41, a second communicator 42, and a second GNSS sensor 43.

The second memory 41 can be constituted of a volatile and/or nonvolatile semiconductor memory. The second communicator 42 is a transmitter/receiver for the navigation device 3 to communicate with a vehicle device such the HMI control device 4, the TCU 6 or the like via the in-vehicle network 7.

The second processor 40 is, for example, a computer that includes a CPU and the like. The second processor 40 may be constituted by having a ROM to which programs are written, and a RAM for temporary storage of data. Also, the second processor 40 includes a route guidance unit 50, a load estimation unit 51, a region specification unit 52, and a notification unit 53, as functional elements or functional units.

These functional elements included in the second processor 40 are implemented, for example, by the second processor 40 that is a computer, the second processor 40 executing a second program 44 stored in the second memory 41. The second program 44 can be stored in an arbitrary computer-readable storage medium. Note that, instead of the above description, all or part of the functional elements included in the second processor 40 may be respectively constituted of hardware including one or more electronic circuit components. The second program 44 constitutes a navigation program in the present disclosure, along with the first program 27 executed by the portable terminal 5 and the third program 63 executed by the HMI control device 4.

The route guidance unit 50 searches a route from a current position of the moving body 2 to a destination, and the route guidance unit 50 performs guidance of the searched route, by the first touch panel 12 and the speaker 14, in cooperation with the HMI control device 4. Here, the destination can be input, for example, by the driver D with the first touch panel 12, in accordance with conventional technology, and the destination can be acquired by the route guidance unit 50 via the HMI control device 4.

In the present embodiment, in particular, the route guidance unit 50 determines a search condition of a route to the destination, based on an evaluation result for a health state of the driver D in the evaluation unit 31 of the portable terminal 5a of the driver D. In this way, route guidance that takes into consideration health deterioration of the driver D can be performed in the navigation system 1.

The route guidance unit 50, for example, transmits an evaluation information request to the portable terminal 5, when the destination has been input, and the route guidance unit 50 acquires, from each portable terminal 5, an evaluation result for a health state of each owner in the evaluation unit 31 of each portable terminal 5 of each owner.

Note that the route guidance unit 50, for example, can specify the position of each portable terminal 5 in the vehicle compartment, based on a reception signal strength of Bluetooth communication, which the second communicator 42 receives from each portable terminal 5, in accordance with conventional technology, and the route guidance unit 50 can determine whether the acquired evaluation result of a health state is related to either the driver D or the passenger P.

In the present embodiment, a first search condition subject to a condition of searching a route where a degree of a driving load estimated for the driver D is lower than a prescribed level can be included in the search condition. In more detail, for example, the first search condition can search a route where a load score to be calculated along the route by a load estimation unit 51, which will be described below, is less than a prescribed value. In this way, a search of a route with a low driving load for a driver can be included as a selection of a route search in the case where a health state of the driver is bad.

Moreover, a second search condition subject to a condition of searching a route passing within a range of a first region in which a distance to a medical related facility is within a prescribed range, or a route passing within a range of a second region in which an arrival time to a medical related facility is within a prescribed range, can be included in the search condition. In more detail, for example, the second search condition can search a route where a ratio of a total distance of a route passing within the first region or within the second region, with respect to a total distance of a route to the destination, is equal to or greater than a prescribed ratio (for example, equal to or greater than 80%). In this way, a search of a route to easily arrive at a medical related facility in case of an emergency can be included as a selection of a route search in the case where a health state of the driver is bad.

Note that a degree of a driving load estimated for the driver D is calculated by a load estimation unit 51, which will be described below. Moreover, the first region and the second region are specified by a region specification unit 52, which will be described below.

For example, when a degree of a health state quality for the driver D evaluated by the evaluation unit 31 of the portable terminal 5a is within a first degree range predetermined as showing a health state worse than a normal health state, the route guidance unit 50 searches a route to the destination by the first search condition. In this way, a health state of the driver D can be prevented or restrained from deteriorating further in the middle of driving the moving body 2.

When there are multiple routes conforming to the first search condition, the route guidance unit 50 can display the multiple routes on the first touch panel 12, and in response to the driver selecting one of the multiple routes, the route guidance unit 50 can perform guidance of the selected route. This selection can be performed by a touch operation to the first touch panel 12, in accordance with conventional technology.

For example, when a degree of a health state quality for the driver D evaluated by the evaluation unit 31 of the portable terminal 5a is within a second degree range predetermined as showing a health state worse than the first degree range, the route guidance unit 50 searches a route to the destination by the second search condition. In this way, a route can be guided so that the driver D easily arrives at a medical related facility, in case of an emergency.

When there are multiple routes conforming to the second search condition, the route guidance unit 50 can display the multiple routes on the first touch panel 12, and in response to the driver selecting one of the multiple routes, the route guidance unit 50 can perform guidance of the selected route. This selection can be performed by a touch operation to the first touch panel 12, in accordance with conventional technology.

Moreover, when a route to the destination searched by using the second search condition includes a route portion passing through a region on a map, the route portion being neither the first region nor the second region, the route guidance unit 50 performs a notification of the fact that the searched route includes this route portion. This notification can be performed by having the route guidance unit 50 instruct a notification unit 53, which will be described below. For example, the route guidance unit 50 performs this notification, when starting route guidance using a searched route by using the second search condition. In this way, since the fact of passing through a route portion of a region on a map, the route portion being neither the first region nor the second region, is notified beforehand, the driver can take measures such as passing quickly through this route portion.

Figure 5:
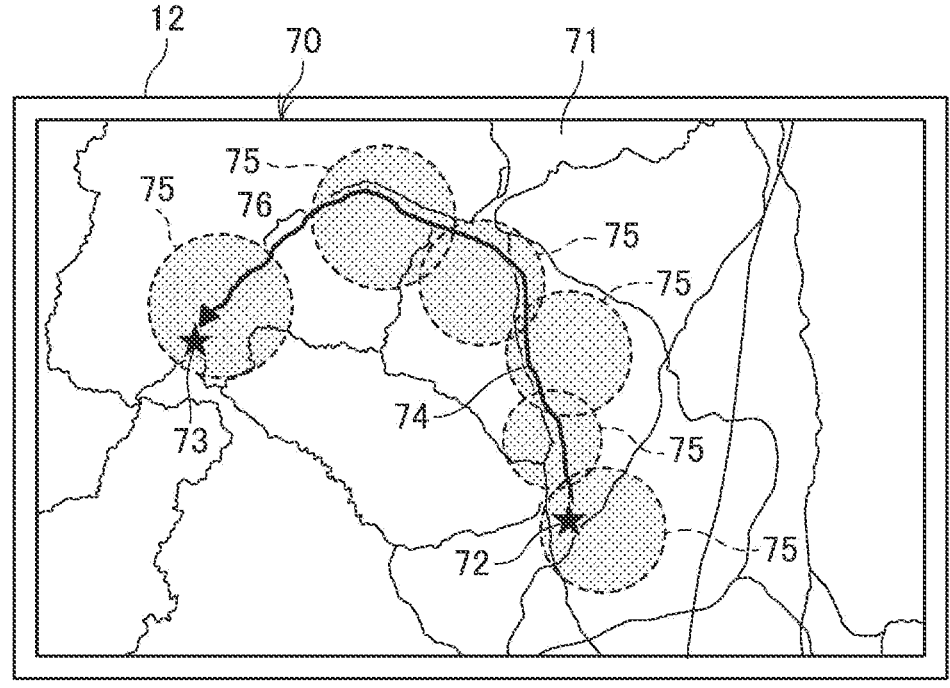
FIG. 5 is a figure showing an example of a route guidance screen for guiding a searched route by a second search condition.

FIG. 5 is a figure showing an example of a route guidance screen displayed on the first touch panel 12 when guiding a searched route by the second search condition. A current position icon 72 showing a current position of the moving body 2, a destination icon 73 showing a destination, and a route 74 searched in accordance with the second search condition are shown, superimposed on a map 71, on the illustrated route guidance screen 70. Moreover, six region displays 75 showing the first region or the second region are displayed, superimposed on the map 71, on the route guidance screen 70. Within the route 74, a route portion 76, on which the region displays 75 are not displayed superimposed, is a route portion passing through a region on a map, the route portion being neither the first region nor the second region. Note that the disk shapes of the region displays 75 shown in FIG. 5 are examples, and the shapes of the region displays 75 can be arbitrary shapes corresponding to the shape of the first region or the shape of the second region on the map.

Note that which of the first region and the second region is used, in the second search condition, can be set from an occupant, such as the driver D, via the first touch panel 12 beforehand. Alternatively, the route guidance unit 50 may display a selection button, superimposed on the route guidance screen 70, for an occupant to instruct whether to apply the second search condition by using either the first region or the second region.

Referring to FIG. 4, in the case where the driver travels along a route, the load estimation unit 51 evaluates a degree of a driving load for the driver estimated for this route. Here, the driving load, for example, can be calculated based on various types of load factors, such as the number of right/left turns until arriving at a destination, the complexity (branch number and the like) of the structure of road branch parts, the road width in each part of the route, the average traffic volume, and/or the occurrence frequency of congestion. These load factors can be acquired from map information or a server such as a traffic control center.

For example, the driving load can be a load score obtained by calculating, along this route, a number representing a degree of a driving load felt by a general driver with respect to the load factors in each part of the route. The load score can be calculated, for example, so as to become a larger value as the driving load increases.

The load estimation unit 51, for example, calculates a load score for each of multiple route candidates to a destination searched by the route guidance unit 50, and the load estimation unit 51 notifies the calculated load score for each route candidate to the route guidance unit 50.

The region specification unit 52 specifies a first region on a map in which a distance from an address of a medical related facility is within a range of a predetermined prescribed distance, and the region specification unit 52 specifies a second region on a map in which an arrival time until arriving at a medical related facility by an applicable arbitrary movement means is within a range of a predetermined prescribed time.

Here, a medical related facility is, for example, a facility related to medical care or treatment by doctors, such as a hospital, a clinic, or a departure/arrival base of a helicopter ambulance (or an Air Ambulance or Helicopter Emergency Medical Service (HEMS)).

The region specification unit 52 can specify, for example, a location and range of the first region, based on a location of a medical related facility and a distance of a road connected to the medical related facility. The region specification unit 52 can specify, other than a location of a medical related facility and a distance of a road connected to the medical related facility, a location and range of the second region, based on information such as a congestion condition of traffic, a current position of an emergency transport vehicle, and a type of transportation means that can be used (emergency transport vehicle, helicopter ambulance, train, bus, and/or taxi and the like). Here, information necessary for the specification of the first region and the second region can be acquired from map information or a server such as a traffic control center.

Instead of the above description or in addition to the above description, when information is obtained for regions equivalent to the first region and the second region from an external server such as a traffic control center server, the region specification unit 52 may acquire this information from the external server, and the region specification unit 52 may specify the first region and the second region.

Moreover, at the time of the specification of the first region and the second region, the region specification unit 52 can collect information for a degree of congestion of a medical related facility, and the region specification unit 52 can specify the first region and the second region targeting a medical related facility where a degree of congestion is lower than a predetermined level. The degree of congestion can be, for example, the number of people waiting for treatment (the number of waiting people) or the waiting time for treatment in a medical related facility. The region specification unit 52, for example, can specify the first region and the second region targeting a medical related facility where the number of waiting people is less than a prescribed number, or a waiting time is less than a prescribed time. In this way, a situation such as the driver being unable to receive prompt treatment at a medical related facility can be prevented from occurring. Note that information for congestion of a medical related facility can be acquired, for example, from a server administered by the medical related facility.

The notification unit 53 performs a notification to the driver. This notification can be performed, for example, by the first touch panel 12 and/or the speaker 14 via the HMI control device 4. As stated above, the notification unit 53, for example, performs a notification of the fact that a route to the destination searched by using the second search condition includes a route portion passing through a region on a map, the route portion being neither the first region nor the second region, by an instruction from the route guidance unit 50.

Moreover, the notification unit 53 acquires, from the portable terminal 5b of the passenger P, a result of an evaluation for a health state of the passenger P in the evaluation unit 31 of this portable terminal 5b. Also, when a degree of a health state quality for the passenger P evaluated by the evaluation unit 31 of the portable terminal 5b is within a degree range predetermined as showing a health state worse than a normal health state, the notification unit 53 performs a notification, to the driver D, of the fact that the health state of the passenger P is bad. In this way, even in the case where there is no direct announcement from the passenger P, the driver D can recognize that a health state of the passenger P is bad, and the driver D can take measures such as performing driving or route selection that takes into consideration a health state of the passenger P.

This notification, other than a notification of the fact that a health state of the passenger P is bad, can be a notification of a question related to route guidance, or a suggestion or recommendation related to route guidance, such as "do you want to take a route close to a hospital?" or "it is recommended to head toward a hospital immediately".

Next, a configuration of the HMI control device 4 included in the moving body 2 will be described.

Figure 6:
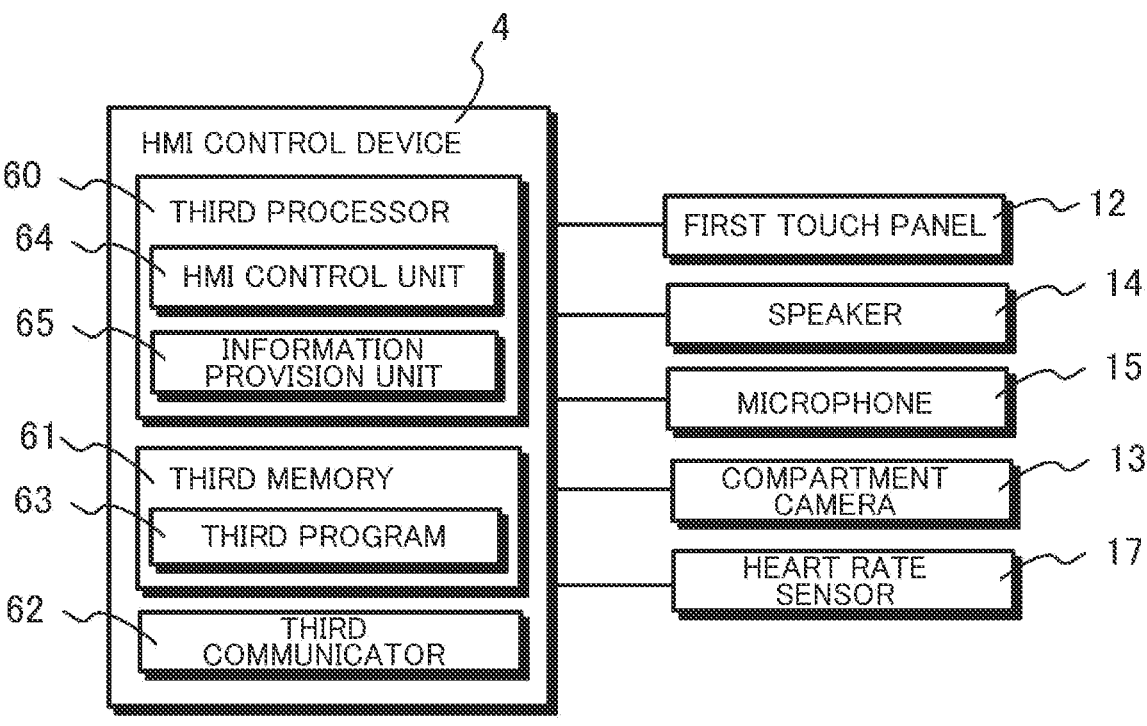
FIG. 6 is a figure showing an example of a configuration of an HMI control device constituting the navigation system.

FIG. 6 is a figure showing an example of a configuration of the HMI control device 4.

The HMI control device 4 includes a third processor 60, a third memory 61, and a third communicator 62.

The third memory 61 can be constituted of a volatile and/or nonvolatile semiconductor memory. The third communicator 62 is a transmitter/receiver for the HMI control device 4 to communicate with a vehicle device such the navigation device 3, the TCU 6 or the like via the in-vehicle network 7.

The third processor 60 is, for example, a computer that includes a CPU and the like. The third processor 60 may be constituted by having a ROM to which programs are written, and a RAM for temporary storage of data. Also, the third processor 60 includes an HMI control unit 64 and an information provision unit 65, as functional elements or functional units.

These functional elements included in the third processor 60 are implemented, for example, by the third processor 60 that is a computer, the third processor 60 executing a third program 63 stored in the third memory 61. The third program 63 can be stored in an arbitrary computer-readable storage medium. Note that, instead of the above description, all or part of the functional elements included in the third processor 60 may be respectively constituted of hardware including one or more electronic circuit components. The third program 63 constitutes a driver assistance program in the present disclosure, along with the first program 27 executed by the portable terminal 5 and the second program 44 executed by the navigation device 3.

The HMI control unit 64 controls the operations of the first touch panel 12, the speaker 14, and the microphone 15, which are HMI devices. Specifically, the HMI control unit 64 displays images, video, text and/or graphics such as icons on the first touch panel 12, and the HMI control unit 64 outputs sounds that include a voice to the speaker 14, by an instruction from the navigation device 3 and/or the portable terminal 5. Moreover, the HMI control unit 64 receives an input by a touch operation from the driver D or the passenger P to the first touch panel 12, the HMI control unit 64 receives voice input to the microphone 15, and the HMI control unit 64 transmits these inputs to the navigation device 3 or the portable terminal 5, by an instruction from the navigation device 3 or the portable terminal 5.

The information provision unit 65 transmits a compartment image captured by the compartment camera 13 and information of a heat rate detected by the heart rate sensor 17 to the navigation device 3 or the portable terminal 5, by an instruction from the navigation device 3 or the portable terminal 5.

Next, a navigation method executed by the navigation system 1 will be described.

Figure 7:
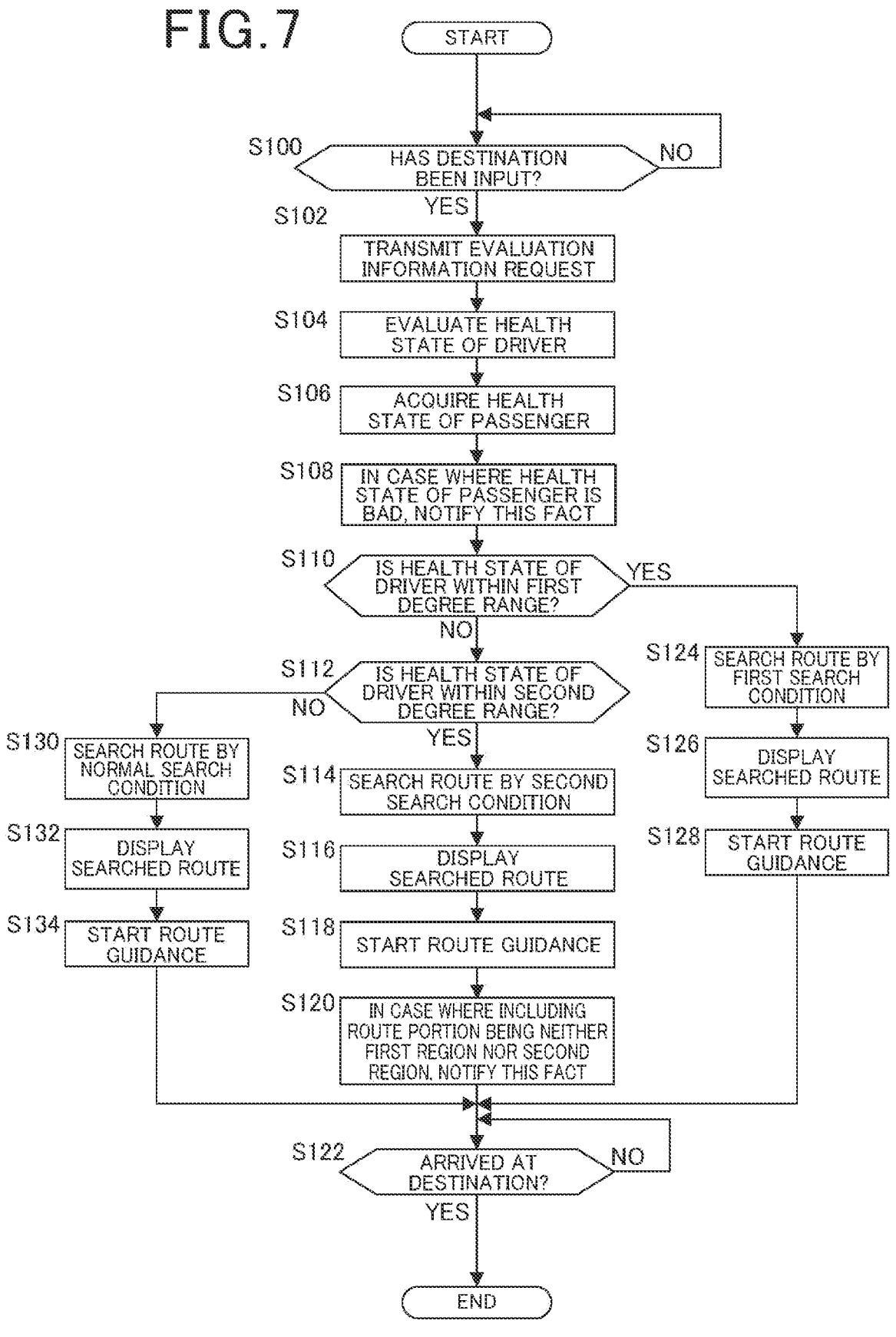
FIG. 7 is a flow chart showing a procedure of processes of a navigation method executed by the navigation system.

FIG. 7 is a flow chart showing a procedure of processes of a navigation method. Note that the processes shown in FIG. 7 are repeatedly executed.

When starting the processes, first, the route guidance unit 50 of the navigation device 3 determines whether or not a destination has been input (S100). The destination is input to the first touch panel 12 by the driver D or another passenger P, for example, in accordance with conventional technology. The navigation device 3 acquires the destination input to the first touch panel 12, via the HMI control device 4.

When the destination has not been input (S100, NO), the route guidance unit 50 repeats step S100, and the route guidance unit 50 waits for the destination to be input. On the other hand, when the destination has been input (S100, YES), the route guidance unit 50 acquires the input destination, and the route guidance unit 50 transmits an evaluation information request, which requests a result of an evaluation for a health state of the driver D and the passenger P, to each of the portable terminals 5a and 5b (S102).

In response to receiving the evaluation information request, the evaluation unit 31 of the portable terminal 5a evaluates a degree of a health state quality for the driver D (S104), and the evaluation unit 31 transmits this evaluation result to the navigation device 3. Here, step S104 corresponds to an evaluation step in the present disclosure.

Moreover, in response to receiving the evaluation information request, the evaluation unit 31 of the portable terminal 5b evaluates a degree of a health state quality for the passenger P (S106), and the evaluation unit 31 transmits this evaluation result to the navigation device 3. The route guidance unit 50 and the notification unit 53 acquire the evaluation result.

When a health state of the passenger P in step S106 is within a degree range predetermined as showing a health state worse than a normal health state, the notification unit 53 performs a notification of the fact that a health state of the passenger P is bad (S108).

Next, the route guidance unit 50 determines whether or not a degree of a health state quality for the driver D is within a first degree range, based on the evaluation result for a health state of the driver D in step S104 (S110).

Then, in step S110, when a degree of a health state quality for the driver D is not within the first degree range (S110, NO), the route guidance unit 50 determines whether or not a degree of a health state quality for the driver D is within a second degree range showing a health state worse than the first degree range (S112). Then, when a degree of a health state quality for the driver D is within the second degree range (S112, YES), the route guidance unit 50 searches a route to the destination, by a second search condition (S114), and the route guidance unit 50 displays the searched route on the first touch panel 12 via the HMI control device 4 (S116). Then, in response to one of the displayed routes being selected via the first touch panel 12, the route guidance unit 50 starts route guidance of the selected route (S118). The selection and the route guidance can be performed by the first touch panel 12, in accordance with conventional technology.

To continue, when a route portion passing through a region on a map, the route portion being neither the first region nor the second region, is included, the route guidance unit 50 instructs the notification unit 53, and the route guidance unit 50 performs a notification of the fact that a route being guided includes this route portion (S120).

To continue, the route guidance unit 50 determines whether or not the moving body 2 has arrived at the destination (S122). Then, when the moving body 2 has not arrived at the destination (S122, NO), the route guidance unit 50 repeats the processes by returning to step S122, and the route guidance unit 50 continues the route guidance started in step S114 until the moving body 2 arrives at the destination. On the other hand, when the moving body 2 has arrived at the destination (S122, YES), the route guidance unit 50 finishes the present processes.

On the other hand, in step S110, when a degree of a health state quality for the driver D is within the first degree range (S110, YES), the route guidance unit 50 searches a route to the destination, by the first search condition (S124), and the route guidance unit 50 displays the searched route on the first touch panel 12 via the HMI control device 4 (S126). Then, in response to one of the displayed routes being selected via the first touch panel 12, the route guidance unit 50 starts route guidance of a selected route (S128), and then the route guidance unit 50 moves the processes to step S122.

On the other hand, in step S112, when a degree of a health state quality for the driver D is not within the second degree range (namely, a health state of the driver D is normal) (S112, NO), the route guidance unit 50 searches a route to the destination, by using a normal search condition such as distance priority, time priority, or general road priority, in accordance with conventional technology (S130), and the route guidance unit 50 displays the searched route (S132). Then, in response to one of the displayed routes being selected via the first touch panel 12, the route guidance unit 50 starts route guidance of the selected route (S134), and the route guidance unit 50 moves the processes to step S122.

In the above description, the processes from step S110 to step S120 and the processes from step S124 to step S134 correspond to a route guidance step in the present disclosure.

OTHER EMBODIMENTS

In the above-stated embodiment, such as the flowchart shown in FIG. 7, while a route search condition is determined by evaluating a health state of the driver D, when a destination has been input, the evaluation and the determination of a route search condition may be repeatedly performed during a time period until arriving at the destination, for example, during a prescribed time interval. In this way, a guidance route can be dynamically modified, in accordance with a change in a health state of the driver D while driving to the destination.

Moreover, the route guidance unit 50 may further perform a route search by the first search condition or the second search condition, based on an instruction from an occupant such as the driver. For example, the route guidance unit 50 can display a button for an occupant to instruct a route search by the first search condition or the second search condition. In this way, for example, when the notification unit 53 performs a notification of the fact that a health state of a passenger is bad, the driver can instruct a route search by the second search condition, in case of an emergency.

The functional elements included in the navigation device 3 may be included in the portable terminal 5a of the driver. In this case, the navigation system 1 can be constituted of the portable terminals 5a, 5b and the HMI control device 4. The route guidance unit 50 included in the portable terminal 5a can perform route guidance with the first touch panel 12, by communicating with the HMI control device 4 by short-range communication such as Bluetooth. In this case, the first program 27 executed by the portable terminal 5a and the third program 63 executed by the HMI control device 4 constitute navigation programs.

Alternatively, the evaluation unit 31 included in the portable terminal 5 can be included in the navigation device 3. In this case, the navigation system 1 is constituted of the navigation device 3 and the HMI control device 4. Moreover, the second program 44 executed by the navigation device 3 and the third program 63 executed by the HMI control device 4 constitute navigation programs. The evaluation unit 31 included in the navigation device 3, for example, can acquire biological data such as blood pressure of the driver D and the passenger P in accordance with conventional technology, based on facial images of the driver D and the passenger P captured by the compartment camera 13, and the evaluation unit 31 can evaluate a degree of a health state quality for the driver D and the passenger P. Moreover, in addition to this, the evaluation unit 31 may evaluate a degree of a health state quality for the driver D, based on information of a heart rate of the driver D obtained from the heart rate sensor 17.

Alternatively, in the above description, the evaluation unit 31 included in the navigation device 3 may evaluate a degree of a health state quality of the driver D and/or the passenger P, based on an evaluation result of a health state that is performed, for example, by a healthcare app (for example, an app that records the blood pressure, number of steps, sleep time and the like of an owner) executed by the portable terminals 5a and/or 5b.

Note that the present invention is not limited to the configurations of the embodiment described above, and the present invention can be implemented in various modes in a range that does not deviate from the content of the present invention.

CONFIGURATIONS SUPPORTED BY THE EMBODIMENT

The above-stated embodiment supports the following configurations.

(Configuration 1) A navigation system that includes an evaluation unit for evaluating a degree of a health state quality for a driver of a moving body, and a route guidance unit for searching a route from a current position of the moving body to a destination, and for performing guidance of the searched route, the route guidance unit determines a search condition of a route to the destination based on an evaluation result of a health state of the driver in the evaluation unit.

According to the navigation system of Configuration 1, route guidance taking into consideration health deterioration of a driver can be performed.

(Configuration 2) The navigation system described in Configuration 1, further including a load estimation unit for evaluating a degree of a driving load estimated for the driver in a case where the driver travels along a route, the search condition includes a first search condition subject to a condition of searching a route where a degree of a driving load estimated for the driver is lower than a prescribed level.

According to the navigation system of Configuration 2, a search of a route with a low driving load for a driver can be included as a selection of a route search in the case where a health state of the driver is bad.

(Configuration 3) The navigation system described in Configuration 2, in which the evaluation unit determines whether a degree of a health state quality for the driver is within a first degree range predetermined as showing a health state worse than a normal health state, or within a second degree range predetermined as showing a health state worse than the first degree range, and when a degree of a health state quality for the driver is within the first degree range, the route guidance unit searches a route to the destination by the first search condition.

According to the navigation system of Configuration 3, a degree range of a health state in the case where the health state is bad is divided into two ranges, and in the case where the severity of the health state of a driver is mild, a route with a low driving load for the driver is guided. Therefore, the health state of the driver can be prevented from deteriorating further.

(Configuration 4) The navigation system described in any one of Configurations 1 to 3, further including a region specification unit for specifying a first region on a map in which a distance from an address of a medical related facility is within a range of a predetermined prescribed distance, and for specifying a second region on a map in which an arrival time until arriving at a medical related facility by an applicable arbitrary movement means is within a range of a predetermined prescribed time, the search condition includes a second search condition subject to a condition of searching a route to the destination, the route passing within a range of the first region and/or the route passing within a range of the second region.

According to the navigation system of Configuration 4, a search of a route to easily arrive at a medical related facility in case of an emergency can be included as a selection of a route search in the case where a health state of a driver is bad.

(Configuration 5) The navigation system described in Configuration 4, in which the evaluation unit determines whether a degree of a health state quality for the driver is within a first degree range predetermined as showing a health state worse than a normal health state, or within a second degree range predetermined as showing a health state worse than the first degree range, and when a degree of a health state quality for the driver is within the second degree range, the route guidance unit searches a route to the destination by the second search condition.

According to the navigation system of Configuration 5, a degree range of a health state in the case where the health state is bad is divided into two ranges, and when a health state of a driver is within a second degree range worse than a first degree range, the driver can easily reach a medical related facility in case of an emergency.

(Configuration 6) The navigation system described in Configuration 5, further including a notification unit for performing a notification to the driver, when a route to the destination searched by using the second search condition includes a route portion passing through a region on a map, the route portion being neither the first region nor the second region, the route guidance unit instructs the notification unit, and the route guidance unit performs a notification of the fact that the searched route includes the route portion.

According to the navigation system of Configuration 6, the fact of passing through a route of a region on a map, the route being neither the first region nor the second region, is notified beforehand. Therefore, a driver can take measures such as quickly passing through this route.

(Configuration 7) The navigation system described in any one of Configurations 4 to 6, in which the region specification unit collects information for a degree of congestion of a medical related facility, and the region specification unit specifies the second region targeting a medical related facility where the degree of congestion is lower than a predetermined level.

According to the navigation system of Configuration 7, a situation such as a driver being unable to receive prompt treatment at a medical related facility can be prevented from occurring.

(Configuration 8) The navigation system described in any one of Configurations 1 to 7, further including a notification unit for performing a notification to the driver, the evaluation unit evaluates a degree of a health state quality for a passenger other than the driver, the passenger being on board the moving body, and when a degree of a health state quality for the passenger evaluated by the evaluation unit is within a degree range predetermined as showing a health state worse than a normal health state, the notification unit performs a notification of the fact that the health state of the passenger is bad.

According to the navigation system of Configuration 8, even in the case where there is no direct announcement from a passenger, a driver can recognize that a health state of the passenger is bad, and the driver can take measures such as performing driving or route selection that takes into consideration a health state of the passenger.

(Configuration 9) A navigation method executed by a computer of a navigation system, the navigation method including an evaluation step for evaluating a degree of a health state quality for a driver of a moving body; and a route guidance step for searching a route from a current position of the moving body to a destination, and the route guidance step for performing guidance of the searched route, in the route guidance step, a search condition of a route to the destination is determined based on an evaluation result of a health state of the driver in the evaluation step.

According to the navigation method of Configuration 9, route guidance taking into consideration health deterioration of a driver can be performed.

(Configuration 10) A navigation program for causing a computer of a navigation system to function as an evaluation unit for evaluating a degree of a health state quality for a driver of a moving body, and a route guidance unit for searching a route from a current position of the moving body to a destination, and for performing guidance of the searched route, the route guidance unit determines a search condition of a route to the destination based on an evaluation result of a health state of the driver in the evaluation unit.

According to the navigation program of Configuration 10, a navigation system can be implemented in which route guidance taking into consideration health deterioration of a driver can be performed.

REFERENCE SIGNS LIST 1 navigation system
2 moving body
3 navigation device

4 HMI control device
5, 5a, 5b portable terminal
6 TCU
7 in-vehicle network
8, 8a, 8b wearable terminal
10 driver's seat
11 instrument panel
12 first touch panel
13 compartment camera
14 speaker
15 microphone
16 steering wheel
17 heart rate sensor
20 first processor
21 first memory
22 first communicator
23 second touch panel
24 camera
25 first GNSS sensor
26 acceleration sensor
27 first program
30 acquisition unit
31 evaluation unit
40 second processor
41 second memory
42 second communicator
43 second GNSS sensor
44 second program
50 route guidance unit
51 load estimation unit
52 region specification unit
53 notification unit
60 third processor
61 third memory
62 third communicator
63 third program
64 HMI control unit
65 information provision unit
70 route guidance screen
71 map (map)
72 current position icon
73 destination icon
74 route
75 region display
D driver
P passenger

What is claimed is:

1. A navigation system, comprising a processor, wherein the processor is configured to:

evaluate a degree of a health state quality for a driver of a moving body; and search a route from a current position of the moving body to a destination, and perform guidance of the searched route, wherein the processor is configured to determine a search condition of a route to the destination based on an evaluation result of a health state of the driver, the processor is configured to specify a first region on a map in which a distance from an address of a medical related facility is within a range of a predetermined prescribed distance, and to specify a second region on a map in which an arrival time until arriving at a medical related facility by an applicable arbitrary movement means is within a range of a predetermined prescribed time, and the search condition includes a first search condition subject to a condition of searching a route to the destination, the route passing within a range of the first region and/or the route passing within a range of the second region.

2. The navigation system according to claim 1, wherein the processor further comprising:

the processor is configured to evaluate a degree of a driving load estimated for the driver in a case where the driver travels along a route, and the search condition includes a second search condition subject to a condition of searching a route where a degree of a driving load estimated for the driver is lower than a prescribed level.

3. The navigation system according to claim 2, wherein the processor is configured to determine whether a degree of a health state quality for the driver is within a first degree range predetermined as showing a health state worse than a normal health state, or within a second degree range predetermined as showing a health state worse than the first degree range, and when a degree of a health state quality for the driver is within the first degree range, the processor is configured to search a route to the destination by the second search condition.

4. The navigation system according to claim 1, wherein the processor is configured to determine whether a degree of a health state quality for the driver is within a first degree range predetermined as showing a health state worse than a normal health state, or within a second degree range predetermined as showing a health state worse than the first degree range, and when a degree of a health state quality for the driver is within the second degree range, the processor is configured to search a route to the destination by the first search condition.

5. The navigation system according to claim 4, wherein the processor is configured to perform a notification to the driver, and when a route to the destination searched by using the first search condition includes a route portion passing through a region on a map, the route portion being neither the first region nor the second region, the processor is configured to perform a notification of the fact that the searched route includes the route portion.

6. The navigation system according to claim 1 wherein the processor is configured to collect information for a degree of congestion of a medical related facility, and specify the second region targeting a medical related facility where the degree of congestion is lower than a predetermined level.

7. The navigation system according to claim 1, wherein the processor is configured to perform a notification to the driver, the processor is configured to evaluate a degree of a health state quality for a passenger other than the driver, the passenger being on board the moving body, and when a degree of a health state quality for the passenger evaluated is within a degree range predetermined as showing a health state worse than a normal health state, the processor is configured to perform a notification of the fact that the health state of the passenger is bad.

8. A navigation method executed by a computer of a navigation system, the navigation method comprising:

an evaluation step for evaluating a degree of a health state quality for a driver of a moving body; and a route guidance step for searching a route from a current position of the moving body to a destination, and the route guidance step for performing guidance of the searched route, wherein in the route guidance step, a search condition of a route to the destination is determined based on an evaluation result of a health state of the driver in the evaluation step, the navigation method further comprises a step of specifying a first region on a map in which a distance from an address of a medical related facility is within a range of a predetermined prescribed distance, and of specifying a second region on a map in which an arrival time until arriving at a medical related facility by an applicable arbitrary movement means is within a range of a predetermined prescribed time, and the search condition determined in the route guidance step includes a first search condition subject to a condition of searching a route to the destination, the route passing within a range of the first region and/or the route passing within a range of the second region.

9. A non-transitory computer-readable storage medium storing a navigation program which is executed by a computer of a navigation system to cause the computer to function as:

an evaluation unit for evaluating a degree of a health state quality for a driver of a moving body; and a route guidance unit for searching a route from a current position of the moving body to a destination, and for performing guidance of the searched route; and a region specification unit for specifying a first region on a map in which a distance from an address of a medical related facility is within a range of a predetermined prescribed distance, and for specifying a second region on a map in which an arrival time until arriving at a medical related facility by an applicable arbitrary movement means is within a range of a predetermined prescribed time, wherein the route guidance unit determines a search condition of a route to the destination based on an evaluation result of a health state of the driver in the evaluation unit, and the search condition includes a first search condition subject to a condition of searching a route to the destination, the route passing within a range of the first region and/or the route passing within a range of the second region.

* * * * *